United States Patent
Brown et al.

(10) Patent No.: US 6,405,192 B1
(45) Date of Patent: Jun. 11, 2002

(54) NAVIGATION ASSISTANT-METHOD AND APPARATUS FOR PROVIDING USER CONFIGURED COMPLEMENTARY INFORMATION FOR DATA BROWSING IN A VIEWER CONTEXT

(75) Inventors: Michael Wayne Brown, Georgetown; Kelvin Roderick Lawrence; Michael A. Paolini, both of Round Rock, all of TX (US)

(73) Assignee: International Business Machines Corporation, Armonk, NY (US)

(\*) Notice: Subject to any disclaimer, the term of this patent is extended or adjusted under 35 U.S.C. 154(b) by 0 days.

(21) Appl. No.: 09/364,696

(22) Filed: Jul. 30, 1999

(51) Int. Cl.⁷ .............................................. G06F 17/30
(52) U.S. Cl. .............................................. 707/3; 707/6
(58) Field of Search .................... 707/3, 501, 10, 707/104, 204, 101, 102, 5; 345/804, 762, 356, 835, 846, 594, 800, 802; 709/204, 250, 206; 341/51

(56) References Cited

U.S. PATENT DOCUMENTS

| | | | |
|---|---|---|---|
| 5,088,052 A | * 2/1992 | Spielman et al. | 345/804 |
| 5,099,426 A | 3/1992 | Carlgren et al. | 704/9 |
| 5,227,771 A | 7/1993 | Kerr et al. | 345/800 |
| 5,339,392 A | * 8/1994 | Risberg et al. | 345/762 |
| 5,365,360 A | 11/1994 | Torres | 345/360 |
| 5,416,901 A | 5/1995 | Torres | 345/835 |
| 5,491,783 A | 2/1996 | Douglas et al. | 345/846 |
| 5,550,969 A | 8/1996 | Torres et al. | 395/159 |
| 5,615,320 A | 3/1997 | Lavendel | 345/594 |
| 5,623,652 A | 4/1997 | Vora et al. | 707/10 |
| 5,699,458 A | 12/1997 | Sprague | 382/250 |
| 5,704,060 A | 12/1997 | Del Monte | 707/104 |
| 5,715,443 A | 2/1998 | Yanagihara et al. | 707/3 |
| 5,737,599 A | 4/1998 | Rowe et al. | 707/10 |
| 5,737,733 A | 4/1998 | Eller | 707/3 |
| 5,742,816 A | 4/1998 | Barr et al. | 707/3 |
| 5,745,889 A | 4/1998 | Burrows | 707/2 |
| 5,754,776 A | 5/1998 | Hales, II et al. | 709/204 |
| 5,787,435 A | 7/1998 | Burrows | 707/102 |
| 5,793,966 A | 8/1998 | Amstein et al. | 709/203 |

(List continued on next page.)

FOREIGN PATENT DOCUMENTS

| | | | |
|---|---|---|---|
| EP | 0 851 367 A1 | 12/1996 | G06F/17/30 |
| EP | NL1007461 | 11/1997 | G06F/17/30 |
| EP | 0 810 520 A1 | 12/1997 | G06F/9/44 |
| JP | 10149372 | 6/1998 | G06F/17/30 |
| WO | WO 97/44726 | 11/1997 | G06F/3/00 |
| WO | WO 98/48546 | 10/1998 | H04L/29/06 |
| WO | WO 98/53411 | 11/1998 | G06F/17/30 |

OTHER PUBLICATIONS

El Saddik, et al.; Exploiting User Behaviour In Prefetching WWW Documents; 1998; xv+326 pp.

(List continued on next page.)

Primary Examiner—Sanjiv Shah
(74) Attorney, Agent, or Firm—Duke W. Yee; Jeffrey S. LaBaw

(57) ABSTRACT

A method of browsing the Internet in which a browser retrieves a web page for presentation to a user. While the web page is being presented, using one or more background threads, the web page is parsed for a set of links to a set of linked web pages and that set of linked pages are retrieved. The set of linked pages is parsed for criteria set by the user. In response to finding the criteria on one or more of the linked pages, the presentation of the first page is changed to indicate the presence of the criteria on respective linked page. The linked pages may be located on the Internet or on local database on a standalone machine for browsing off-line.

55 Claims, 10 Drawing Sheets

U.S. PATENT DOCUMENTS

| | | | | |
|---|---|---|---|---|
| 5,797,008 A | 8/1998 | Burrows | | 707/101 |
| 5,809,502 A | 9/1998 | Burrows | | 707/7 |
| 5,812,134 A | 9/1998 | Pooser et al. | | 345/356 |
| 5,812,999 A | 9/1998 | Tateno | | 707/3 |
| 5,819,032 A | 10/1998 | de Vries et al. | | 709/250 |
| 5,826,261 A | 10/1998 | Spencer | | 707/5 |
| 5,854,597 A | 12/1998 | Murashita et al. | | 341/51 |
| 5,860,071 A | 1/1999 | Ball et al. | | 707/100 |
| 5,864,863 A | 1/1999 | Burrows | | 707/103 |
| 5,870,549 A | 2/1999 | Bobo, III | | 709/206 |
| 5,873,076 A | 2/1999 | Barr et al. | | 707/3 |
| 6,226,655 B1 * | 5/2001 | Borman et al. | | 707/501 |

OTHER PUBLICATIONS

IBM Technical Disclosure Bulletin; Method for Providing A Summary for Web Page Links; vol. 41, No. 01, Jan. 1998 pp. 185–186.

IBM Technical Disclosure Bulletin; Proactive Universal Resource Locators Lookup In Internet Web Browsers; vol. 40, No. 09, Sep. 1997 p. 113.

Thumbnail Views; www.softquad.co.uk/products/hotmetal/reviewersguide/09.html.

Special Edition Using Windows 98, Managing Files Using Web View, pp. 1–9, www.itlibrary.com/library/0789714884/ch08/ch098.html.

Web Thumbnailer, The Easiest Way to Generate Thumbnail Web Pages of Your Favorite Images; Dragon Works Software; www.majordomo.net/dragonworks/.

Hirsch et al; Creating Custom Graphical Web Views Based On User Browsing History; Feb. 16, 1999; pp. 1–14.

Dorsey et al; Pretty as the Picture; May 1, 1998; pp 1–9.

International Business Machines Corporation; Efficient 3D Method for Displaying Browser Uniform Resource Locator Bookmarks; Jan. 1998; Technical Disclosure Bulletin pp. 1–3.

* cited by examiner

NAVIGATION ASSISTANT-METHOD AND APPARATUS FOR PROVIDING USER CONFIGURED COMPLEMENTARY INFORMATION FOR DATA BROWSING IN A VIEWER CONTEXT

CROSS REFERENCE TO RELATED APPLICATIONS

The present application is related to copending U.S. patent application Ser. No. 09/364,694 now U.S. patent application Ser. No. 09/364,740. now pending U.S. patent application Ser. No. 09/364,963, now pending, and U.S. patent application Ser. No. 09/364,695 filed even date herewith now pending. The above mentioned patent applications are assigned to the assignee of and share the same inventors as the present invention. The content of the cross referenced copending applications are hereby incorporated herein by reference.

BACKGROUND OF THE INVENTION

1. Technical Field

The present invention relates to an improved computer system and in particular to computer software and more particularly to web browser software. Still more particularly, the present invention provides a method and apparatus for filtering and previewing data.

2. Description of Related Art

The "Internet" is a globally accessible network of computers that collectively provide a large amount and variety of information to users. From services of the Internet such as the World Wide Web (or simply, the "web"), users may retrieve or "download" data from Internet network sites and display the data that includes information presented as text in various fonts, graphics, images, and the like having an appearance intended by the publisher. As the information revolution has exploded, more and more information is available through the internet. However, finding particular pieces of information out of the millions of "web sites" available can be daunting.

One way of sorting through this mass of information to find what is of interest for a particular user is through the use of "search engines". Search engines are software written to search, among the millions of web sites, for certain key words or criteria entered by a user, and to return to the user a list of links (references to other HTML pages) to the sites that the search engine determines to be most relevant to the criteria entered by the user. Different search engines use different methods of determining the relevance of web sites, but most use some sort of quantitative method that determines the relevance of a site based on how many times the key words appear in that particular site.

Search engines typically return only a list of links to relevant sites with perhaps a short verbal description of the site. Often times, this list does not provide sufficient information to enable one to make an intelligent decision as to whether to follow the link. Thus, the user is left with the time consuming task of sorting through the links returned by the search engine to determine which of these is the best match. Furthermore, no mechanism is present for a user to determine, based on the search engine results, whether the site is still active or if it has been removed. This problem can be seen by referring to FIG. 1, which depicts a screen image of a returned search result from Altavista. Each link includes only a brief description of the site, but no indication of whether the link is still good or whether the link contains an excessive quantity of broken links within it.

Similar problems exist with regard to following links from one web page to another (sometimes referred to as "web surfing"). Often times, users find the information they are looking for by following links on web pages, but the same problem exist here as with search engines. Many times the links will have only short descriptions about the contents of the web page to which they link. Furthermore, many times a web page will contain a dead link and there is no way the user can determine this except by trial and error.

Therefore, it would be beneficial for Internet users to have a tool to enable them to make more informed decisions about which links to follow.

SUMMARY OF THE INVENTION

The present invention provides a method of browsing the Internet. According to a preferred embodiment, a browser retrieves a web page for presentation to a user. While the web page is being presented, using one or more background threads, the web page is parsed for a set of links to a set of linked web pages and that set of linked pages are retrieved. The set of linked pages is parsed for criteria set by the user. In response to finding the criteria on one or more of the linked pages, the presentation of the first page is changed, ideally in real time as a user watched, to indicate the presence of the criteria on respective linked page.

In another embodiment, at least two different criteria are set by the user and the presentation of the web page is altered in different manners depending on which of the different criteria are found on respective pages.

In another embodiment, a thumbnail of each of the linked pages is generated and an indicator over a respective thumbnail is provided to indicate the presence of the criteria on a respective linked page.

In another embodiment, the linked pages are contained in a local database on a standalone machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
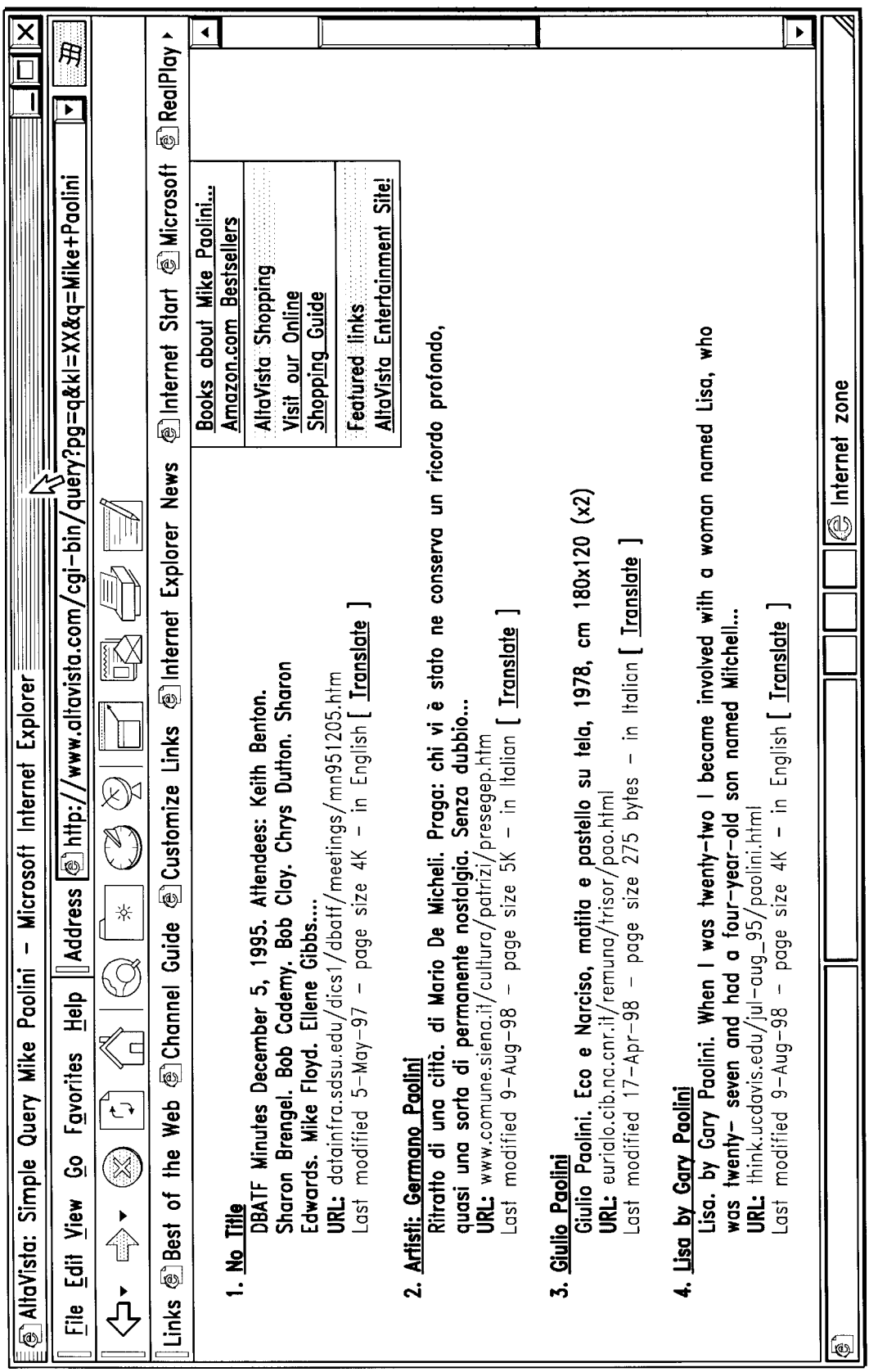
FIG. 1 (Prior Art) depicts a screen image of search results presented using Altavista without aid of the present invention.
Figure 2:
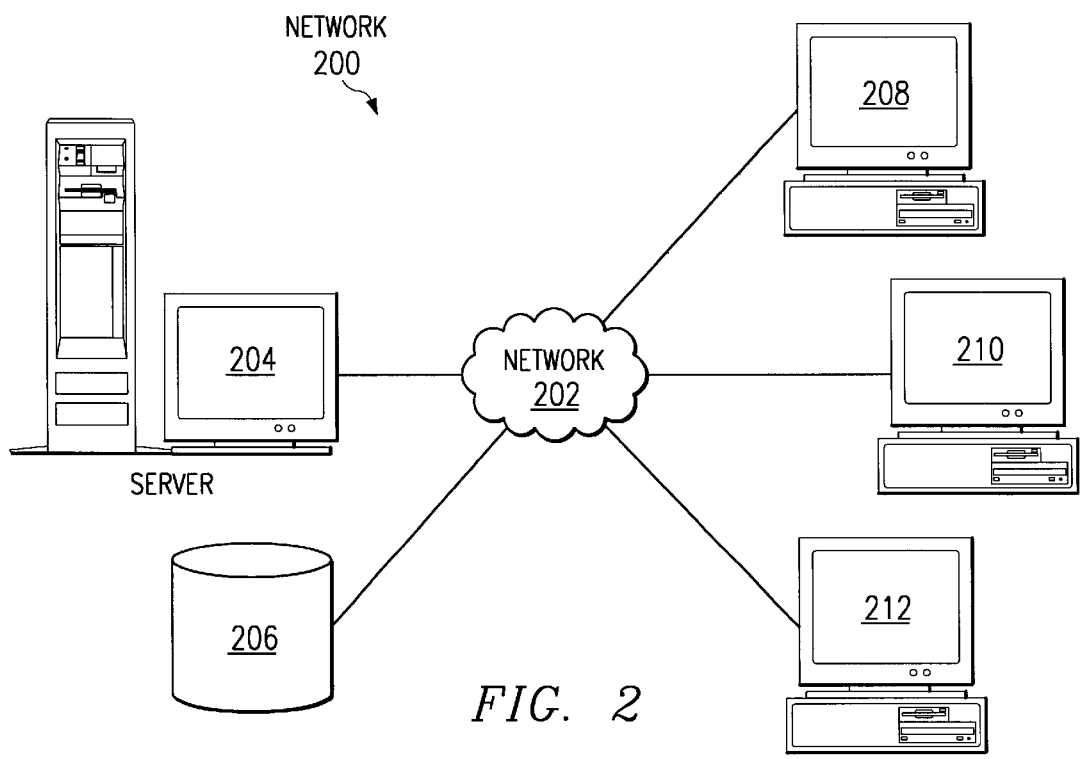
FIG. 2 depicts a pictorial representation of a distributed data processing system in which the present invention may be implemented.

With reference now to the FIGS., and in particular with reference to FIG. 2, a pictorial representation of a distributed data processing system is depicted in which the present invention may be implemented.

Distributed data processing system 200 is a network of computers. in which the present invention may be implemented. Distributed data processing system 200 contains network 202, which is the medium used to provide communications links between various devices and computers connected within distributed data processing system 200. Network 202 may include permanent connections, such as wire or fiber optic cables, or temporary connections made through telephone connections.

In the depicted example, server 204 is connected to network 202, along with storage unit 206. In addition, clients 208, 210 and 212 are also connected to network 202. These clients, 208, 210 and 212, may be, for example, personal computers or network computers. For purposes of this application, a network computer is any computer coupled to a network which receives a program or other application from another computer coupled to the network. In the depicted example, server 204 provides data, such as boot files, operating system images and applications, to clients 208–212. Clients 208, 210 and 212 are clients to server 204. Distributed data processing system 200 may include additional servers, clients, and other devices not shown. Distributed data processing system 200 also includes printers 214, 216 and 218. A client, such as client 210, may print directly to printer 214. Clients such as client 208 and client 212 do not have directly attached printers. These clients may print to printer 216, which is attached to server 204, or to printer 218, which is a network printer that does not require connection to a computer for printing documents. Client 210, alternatively, may print to printer 216 or printer 218, depending on the printer type and the document requirements.

In the depicted example, distributed data processing system 200-is the Internet, with network 202 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 200 also may be implemented as a number of different types of networks such as, for example, an intranet or a local area network.

FIG. 2 is intended as an example and not as an architectural limitation for the processes of the present invention.

Figure 3:
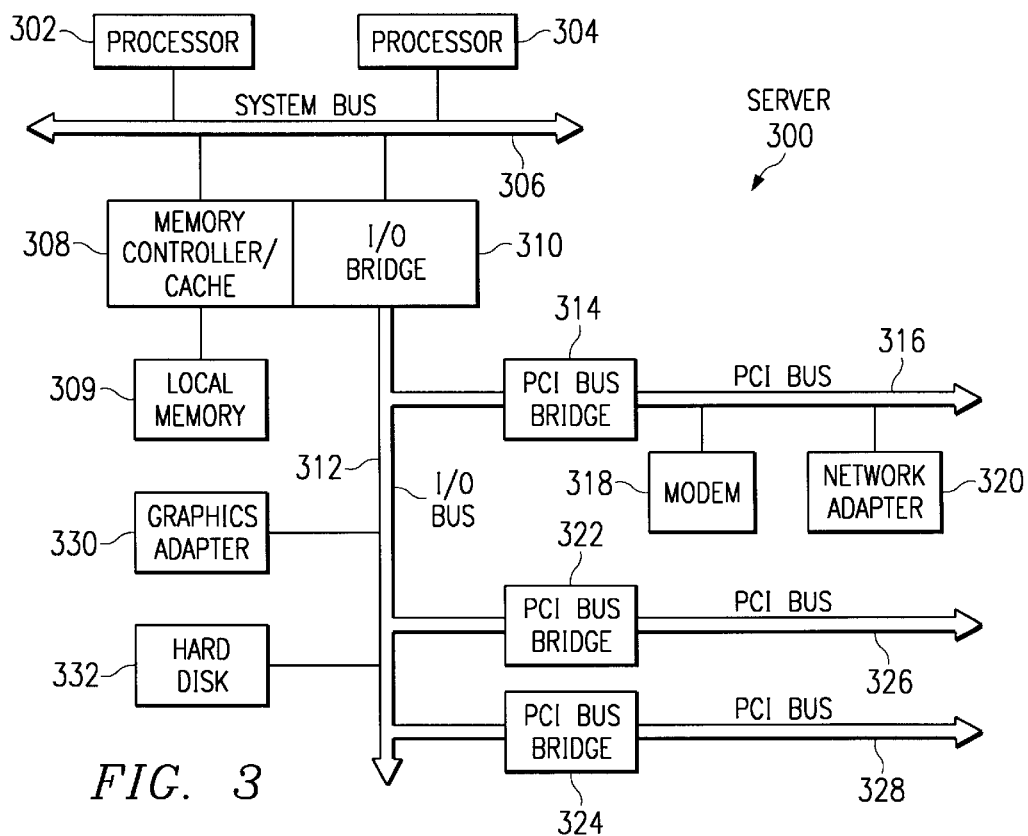
FIG. 3 depicts a block diagram of a data processing system that may be implemented as a server.

Referring to FIG. 3, a block diagram of a data processing system which may be implemented as a server, such as server 204 in FIG. 2, is depicted in accordance with the present invention. Data processing system 300 may be a symmetric multiprocessor (SMP) system including a plurality of processors 302 and 304 connected to system bus 306. Alternatively, a single processor system may be employed. Data processing system 300 is suitable as a domain host or other server connected to the Internet. also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems 318–320 may be connected to PCI bus 316. Typical PCI bus implementations will support four PCI expansion slots or add-in connectors. Communications links to network computers 208–212 in FIG. 2 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000, a product of International Business Machines Corporation in Armonk, New York, running the Advanced Interactive Executive (AIX) operating system.

Figure 4:
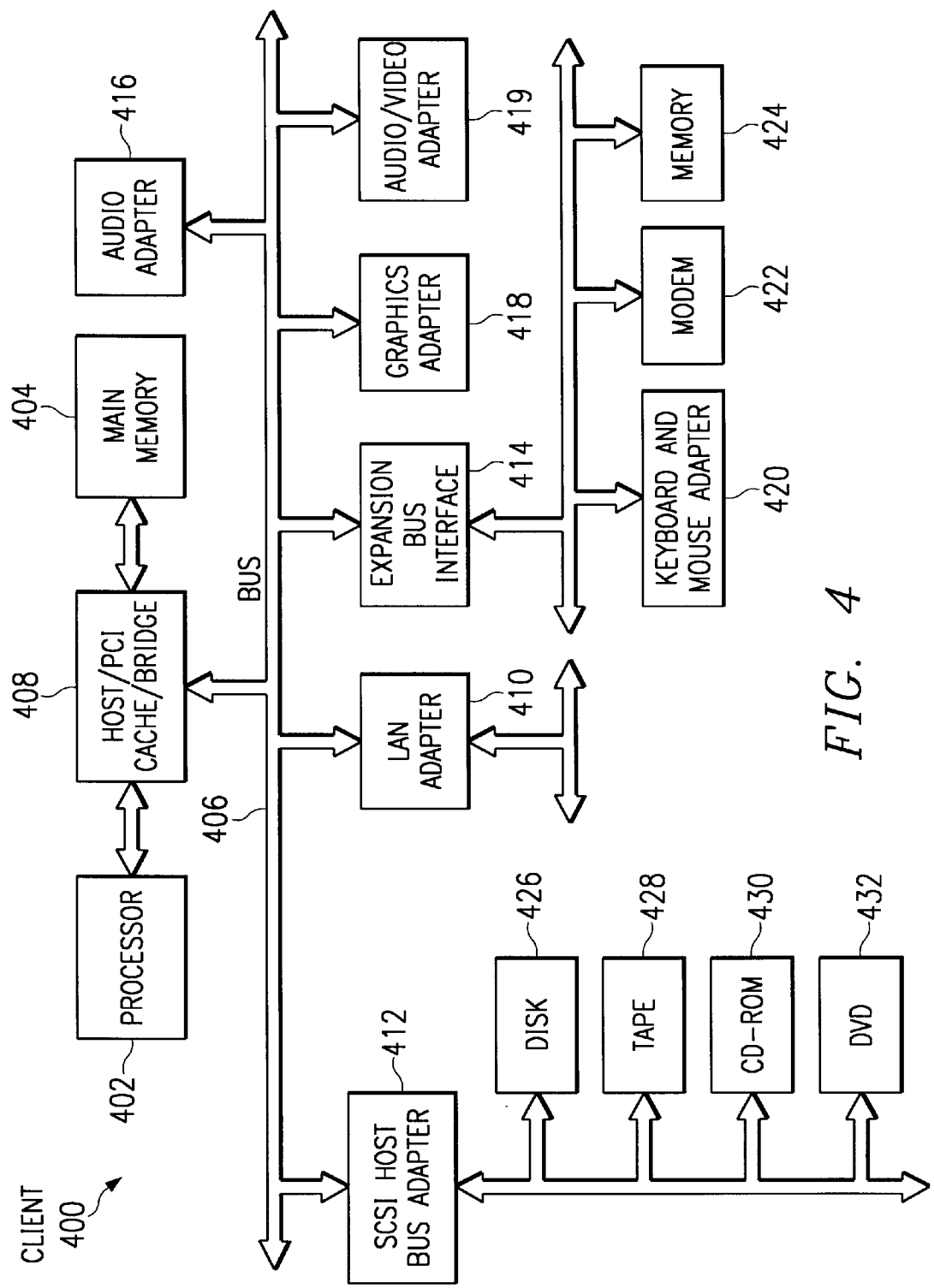
FIG. 4 depicts a block diagram of a data processing system that may be used as a client computer in accordance with the present invention.

With reference now to FIG. 4, a block diagram of a data processing system in which the present invention may be implemented is illustrated. Data processing system 400 is an example of a client computer. Data processing system 400 is suitable from running web browsing programs such as Netscape Navigator and Microsoft Internet Explorer, such programs being compatible with the present invention. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 400. Instructions for the operating system, the object-oriented operating system, and applications or programs are located on a storage device, such as hard disk drive 426, and may be loaded into main memory 404 for execution by processor 402.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

Figure 5:
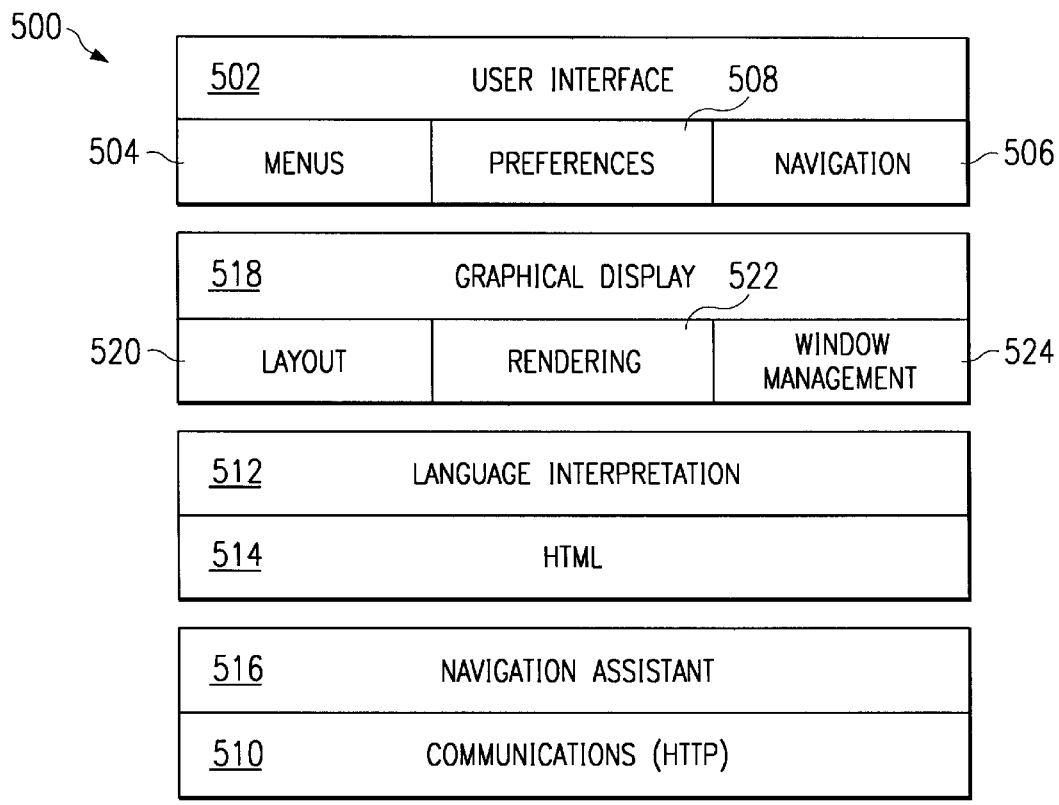
FIG. 5 depicts a block diagram of a browser program in accordance with a preferred embodiment of the present invention.

Turning next to FIG. 5, a block diagram of a browser program is depicted in accordance with a preferred embodiment of the present invention. Browser 500 includes a user interface 502, which is a graphical user interface (GUI) that allows the user to interface or communicate with browser 500. This interface provides for selection of various functions through menus 504 and allows for navigation through the navigation button 506 or selections. For example, menu 504 may allow a user to perform various functions, such as saving a file, opening a new window, displaying a history, and entering a URL. Navigation 506 allows for a user to navigate various pages and to select web sites for viewing. For example, navigation 506 may allow a user to see a previous page or a subsequent page relative to the present page. Preferences may be set through preferences 508.

Communications 510 is the mechanism with which browser 500 receives documents and other resources from a network such as the Internet. Further, communications 510 is used to send or upload documents and resources onto a network. Navigation Assistant 516 intercepts and parses documents after communications 510 receives documents, but prior to processing by language interpretation 512. In the depicted example, communication 510 uses HTTP. However, other protocols are possible. Documents that are received by browser 500 are processed by language interpretation 512, which includes an HTML unit 514. Language interpretation 512 will process a document for presentation on graphical display 518. In particular, HTML statements are processed by HTML unit 514 for presentation.

Graphical display 518 includes layout unit 520, rendering unit 522, and window management 524. These units are involved in presenting web pages to a user based on results from language interpretation 512.

In the present example, navigation assistant 516 is depicted as a "plug-in" module to browser 500. Plug-in refers to a file containing data or application software used to alter, enhance, or extend the operation of a parent application program. For example, the Netscape Navigator World-Wide Web browser supports plug-ins. However, although the "plug-in" module is the preferred embodiment, navigation assistant 516 could be incorporated into browser 500 as a direct modification of code. Furthermore, navigation assistant 516 could be utilized on a proxy server wherein navigation assistant 516 pre-filters web pages on a web server prior to receipt by browser 500.

Browser 500 is presented as an example of a browser program in which the present invention may be embodied. Browser 500 is not meant to imply architectural limitations to the present invention. Presently available browsers may include additional functions not shown or may omit functions shown in browser 500. As used herein, the term "browser" encompasses any software application used to view or navigate for information or data (e.g., something that assist a user to browser) in a distributed data base where the distributed database is typically the internet or World Wide Web.

An overview of a preferred embodiment of the present invention is illustrated with reference to the flow chart depicted in FIG. 6. As a user loads a web page (step 610), the navigation assistant parses the web page for user specified criteria (step 620). The navigation assistant is hooked into the prefetch mechanism of the web browser if the web browser has a prefetch mechanism. The web pages associated with any links found on the loaded web page are prefetched and the navigation assistant parses the prefetched web pages for user specified criteria (step 630). All of this is performed while the web page is loading and while the user is viewing the contents of the loaded web page. Furthermore, if the prefetch fetches web pages that are several links removed from the presently viewed web page, the navigation assistant can parse these pages for user specified criteria as well. If the navigation assistant finds some or all of the user specified criteria in the current web page or in one of the prefetched web pages, the current web page's appearance is changed or information is directed to the display area in a user configured manner (step 650). Ideally, the change to change the appearance would effect the representation of the link or the data found in a user customizable way. this may be actual modification of the data (in the case of HTML, the HTML source file which is downloaded to the browser would be modified to insert such things as tags (<b></b>(bold) or <i></i>(italics)), new icons, replacement of images, etc. Such a thing might be done to introduce navigation support to a legacy browser (e.g., a browser which did no support a navigation plug-in), or to allow parsing and fetching to be done at a remote server). On the other hand it might also be done in a way that did not effect the raw data (e.g., the HTML source), but only the appearance of the unmodified data with regard to the viewer/browser. Either way this may mean inserting an icon at the presence of the data (e.g., an icon of a small eye as the character before a word or picture which had the preferred data as an alternate reference), or it may mean changing text color, text size, changing the font (e.g., making it bold or italic or both) or adding a translucent shading over an image or text, causing the text or image to appear selected (e.g., the same shading that occurs when you use a "find in document command" - typically inverting the text) or even adding a border or colored border around a word or image. It may also mean replacing or overlaying the data with something the user configured such as a "Do Not Enter Sign" or drawing a box around it.

Figure 6:
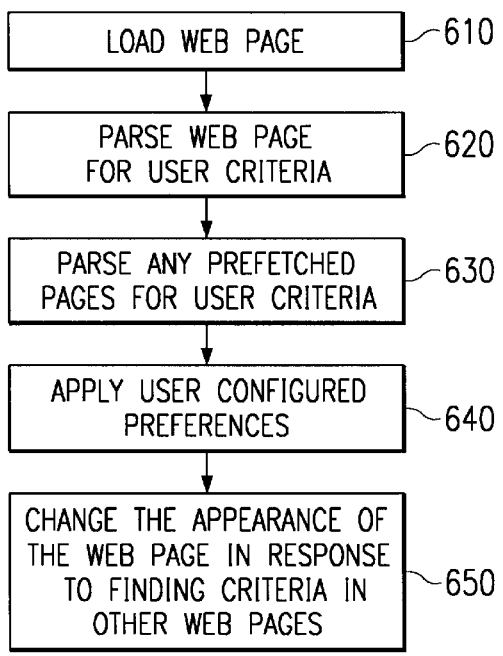
FIG. 6 depicts a flow chart for a preferred embodiment of the invention.
Figure 7A:
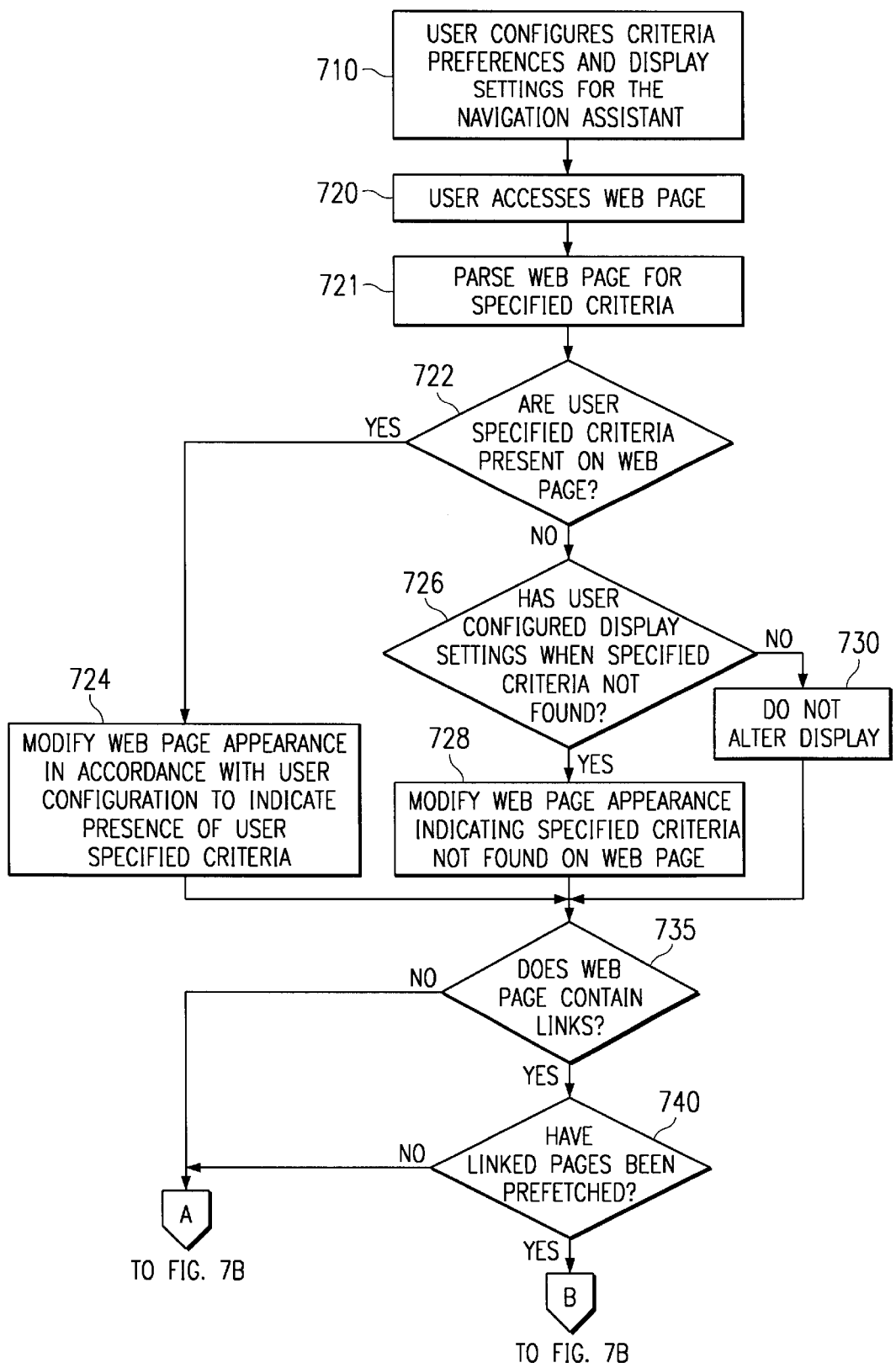
FIG. 7 depicts a more detailed flow chart of the method illustrated in FIG. 8.
Figure 7B:
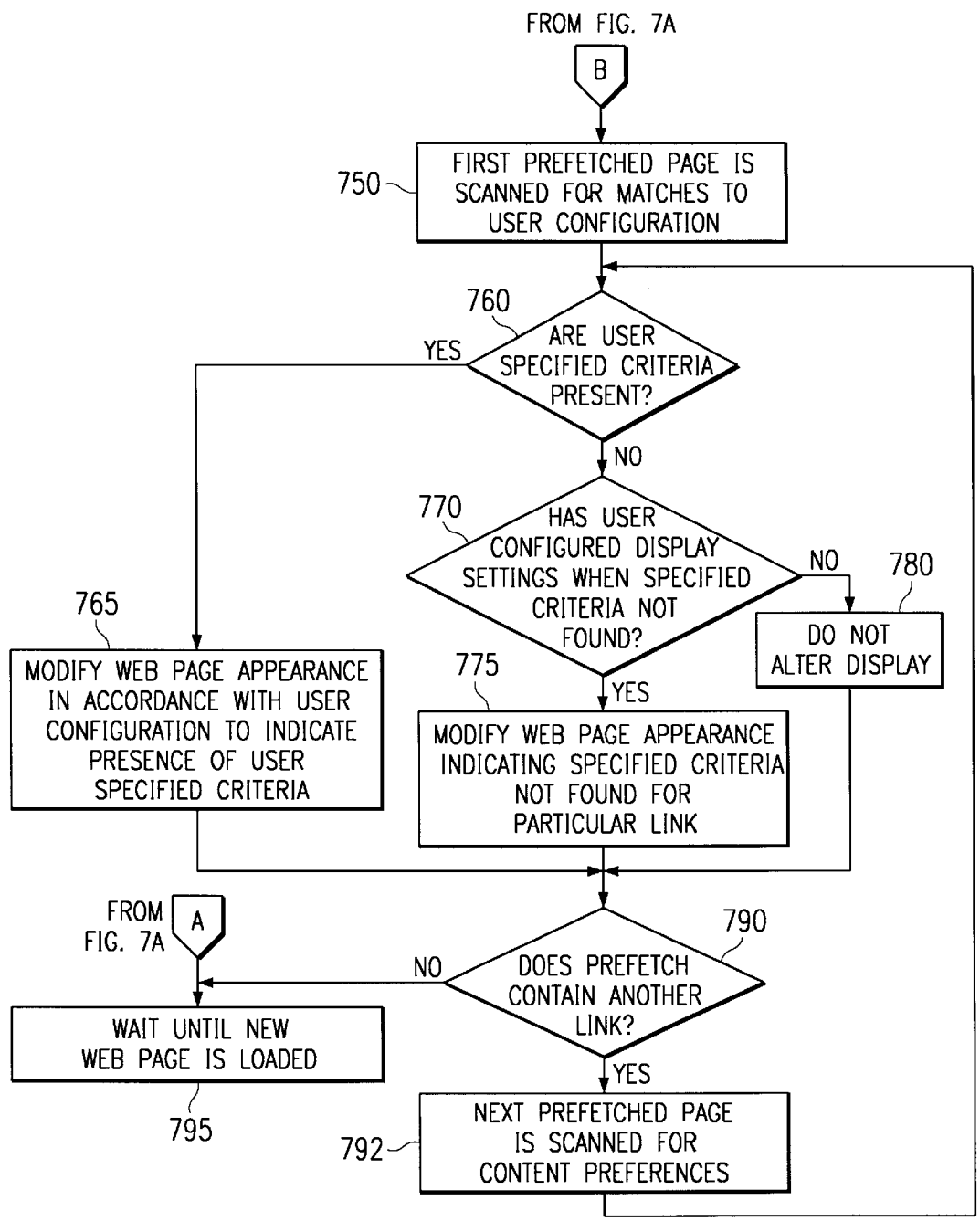

A more detailed flowchart of the method depicted in FIG. 6 is depicted in FIG. 7. A user configures display and content preferences for the navigation assistant (step 710). The user accesses a web page using a web browser, such as Netscape Navigator or Microsoft Internet Explorer (step 720). While the web page is being loaded and presented to the user, the web page is parsed for user specified criteria (step 721). If user specified criteria are present on the web page (step 722), then the web page appearance is modified in accordance with user configured display preferences to indicate the presence of user specified criteria (step 724). If no user specified criteria are present on the web page (step 722), then the navigation assistant determines if the user has configured a display setting when criteria not found (step 726). If display settings have been set for when criteria not found (step 726), then the web page appearance is modified to indicate that no user specified criteria are present on the web page (step 728). If no display settings have been set for indicating the lack of criteria (step 726), then the web page appearance is not altered (step 730).

After parsing the web page and configuring display settings in response to the presence or absence of user specified criteria, the navigation assistant parses the web page to determine if it contains links (universal resource locators "URLs") to other web pages (step 735). If it does not, then the navigation assistant waits until a new web page is loaded at which point the process is repeated (step 795). If the web page does contain links to other web pages (step 735), then the navigation assistant determines whether the linked pages have been prefetched by the browser's prefetch mechanism (step 740). If no prefetch mechanism exists, has been turned off, or if links have failed to load for some reason, the navigation assistant waits for a new web page to be loaded (step 795). However, if no prefetch mechanism exists in the particular browser, there are four options which may be exercised prior to waiting for a new page to loaded (step 795). One is to search only those pages loaded as they are loaded. A second and most preferred option is to install a prefetching mechanism. A third option is to rely on a remote mechanism such as a server to prefetch, parse and convey information to the local system (e.g., simulate prefetching on the client by actually doing it on the server and forwarding the results). A fourth option is to have a built in prefetch mechanism in the navigation assistant itself to which the navigation assistant would default.

If linked web pages have been prefetched (step 740), then the first prefetched page is scanned for matches to user configured document preferences (step 750). Steps 750 and 760 correspond to step 630 in FIG. 6. The navigation assistant then determines whether user specified criteria are present in this first prefetched page (step 760).

If user's specified criteria are present within this first prefetched page, then the appearance of the currently displayed web page is modified in accordance with user display configurations to indicate the presence of user specified criteria (step 765). However, if none of the user's specified criteria are present, then the navigation assistant determines whether the user has configured display settings for links that lack specified criteria (step 770). If the user has configured display settings for links corresponding to web pages that lack specified criteria specified by the user, then the web page appearance is modified in accordance with these display preferences (step 775). If no display settings have been configured for web pages not containing any user specified criteria, then the web page appearance is not altered (step 780).

After the web page has been modified or left unaltered, depending on the results of scanning the first prefetched page, the navigation assistant determines whether another linked page has been prefetched (step 790). If another prefetched page exists, then this prefetched page is scanned for content preferences (step 792) and the process of steps 760 through 790 are repeated until there are no prefetched pages that have not been scanned for user configured specified criteria. Steps 760 through 795 correspond to the processes of steps 640 and 650 shown in FIG. 6. At such point, the navigation assistant waits for a new web page to be accessed (step 795).

Figure 8:
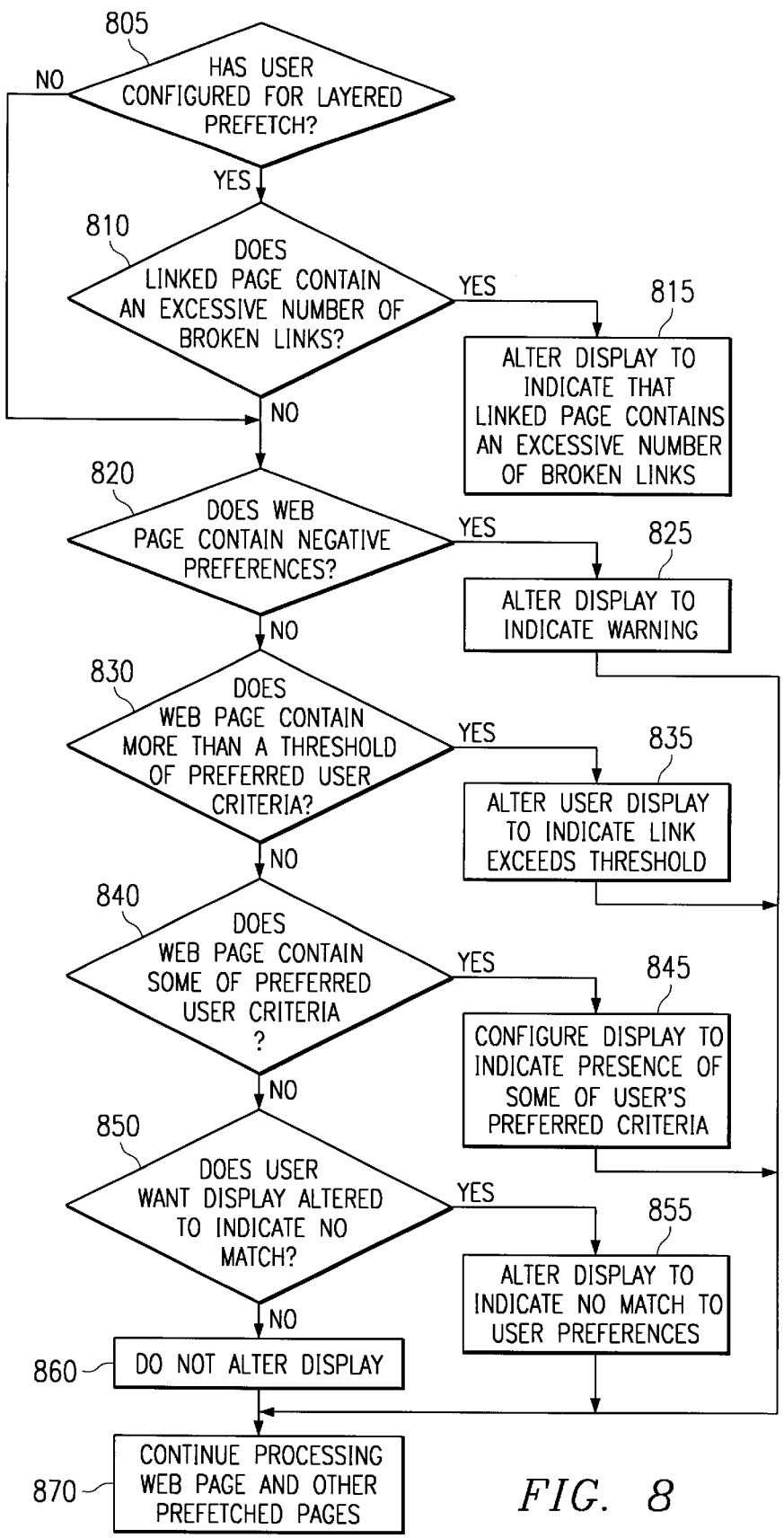
FIG. 8 depicts a flow chart for altering the display in response to user preferences.

A more detailed understanding of the steps involved in modifying the presentation of the web page (steps 722–730 and steps 760–780 of FIG. 7) is given with reference to FIG. 8. The navigation assistant must first determine whether the user has configured the preferences for a layered prefetch (step 805). In a layered prefetch, the navigator not only prefetches the web pages associated with the links on the currently displayed web page (first layer), but also prefetches the web pages associated with links on the web pages associated with the links on the currently displayed web page (second layer). This layered prefetch can be carried out to multiple layers (greater than two) as far as the user wishes consistent hardware and software constraints such as available memory and download speed.

If the user has configured the preferences for a layered prefetch, the navigation assistant determines whether each linked web page contains an excessive number of broken links (step 810). What constitutes an excessive number is determined by the user or plugin maker and can be given in terms of absolute numbers or in percentage of broken links to good links. A broken link is a link that, if followed, does not retrieve a web page or retrieves a web page containing a message indicating that the subject matter has moved, been removed, etc. If the navigator determines that the linked web page contains an excessive number of broken links, then the display is altered in some manner to indicate that the web page associated with that particular link contains an excessive number of broken links (step 815). As an example, this could be accomplished by modifying the color of the link to perhaps gray where gray would be an indication to the user that the link contains an excessive number of broken links. Another example would be to display an image next to the link where the image would indicate that the web page associated with the link contains an excessive number of broken links. However, each of these is merely an example of a method of indicating the information to the user and, therefore, do not limit the scope of the present invention. Additionally, the navigation assistant could parse second, third, etc. level pages for excessive broken links, etc.

If the user has not configured for a layered prefetch (step 805) or if the web page associated with the link does not contain an excessive number of broken links (step 810), then the navigator parses the present web page or prefetched web page, as the case may be, to determine whether it contains user configured negative (step 820). Negative preferences may be content related where the user has indicated key words or subject matter which is not wanted such as adult oriented material. Other examples of negative preferences include or relate to the size of the web page; avi's; music; number of links; number of images; total size of images; JavaScript presence; Java Applet presence; domain name suffix; author; and date of information, i.e. less than seven days old. If such unwanted material or characteristics are present on the web page, then the appearance of the currently viewed web page is altered to reflect such information (step 825). Examples of such modification include presenting an image of a circle with a line through it next to the link to indicate that the associated web page contains unwanted characteristics.

If the web page does not contain negative preferences, then the web page is parsed to determine if it contains more than a threshold amount of positive preferences (step 830). Positive preferences (or criteria) are preferences that the user desires in a web page. The positive preferences may relate to content and key words or it can relate to characteristics about the web page itself such as date of creation, author, etc. Thus, the same kinds of information can be searched for whether desired (positive preferences) or unwanted (negative preferences). Other examples of user specified criteria or preferences include determining the speed of the download for a particular linked page or whether a web page is secure (these could also be included as negative criteria as well). If the amount of positive preferences exceeds a threshold (step 830), then the appearance of the current web page is modified to indicate such information (step 835).

If the web page does not contain more than a threshold of preferred user criteria (step 830), but does contain some of the preferred user criteria (step 840), then the appearance of the web page is altered to indicate the presence of some of the user's criteria (step 845).

However, if the web page does not contain any of the user's criteria (step 840), then the navigation assistant determines whether the user has chosen a configuration which alters the display if a web page contains no matches to the user's criteria (step 850). If the user has configured the navigation assistant to alter the appearance of the web page, then the navigation assistant changes the appearance of the web page to indicate that that particular link does not contain any matches to the user's specified criteria (step 855). Examples of changes to appearance include changing the color of the link to gray or to displaying an image next to the link indicating that none of the user's criteria were matched by the link.

If the user has not configured the navigation assistant to alter the appearance of the web page, then the web page appearance is left as it is (step 860). The navigation assistant, after modifying (as in steps 825, 835, 845, or 855) or leaving display unaltered (as in step 860), continues processing the web page and other web pages in the same fashion for other user specified criteria until all of the user specified criteria have been searched for in the viewed web page as well as in any and all prefetched web pages (step 870).

Although the present invention has been described primarily with reference to modifying the appearance of the web page to indicate the presence or absence of user preferences, this is not the only option for conveying this information to the user. Other options exist as will be obvious to one skilled in the art. Other examples include, but are not limited to, opening another window on the user's computer and displaying the desired or undesired information within the new window, having the appropriate information "pop-up" as the user's pointer passes over a link, or indicating to the user through sounds as the user passes over a link whether that link matches some or more of the user's preferred criteria. Furthermore, combinations of options could be provided as well. For example, a general indication of desired or undesired material may change the appearance of the link. However, when the pointer is proximate to a particular link, details as to which criteria are present can then be listed in a popup.

Figure 9:
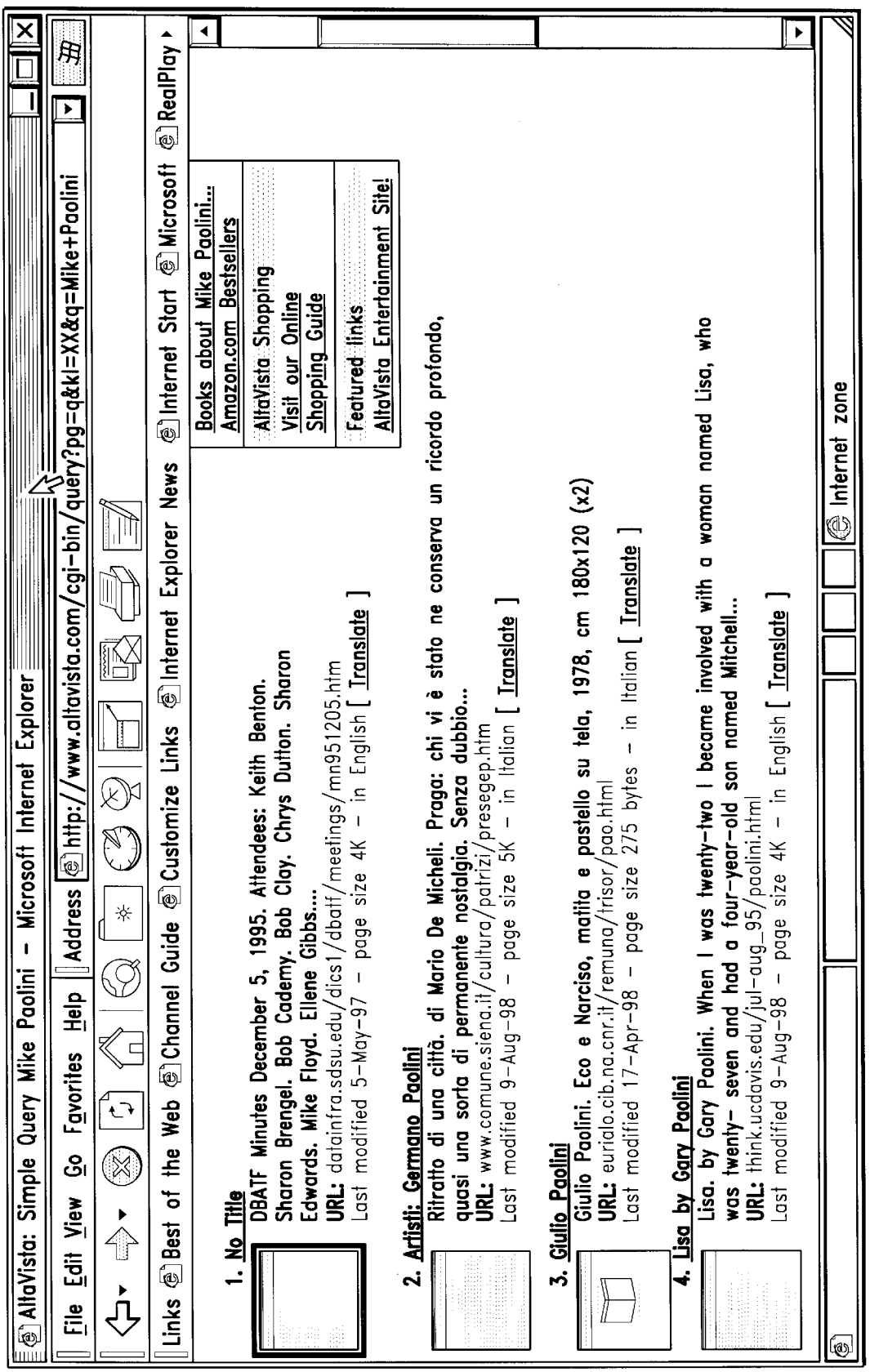
FIG. 9 depicts a screen image of search results using the present invention in combination with in-line thumbnail generation.

Another possibility for indicating to the user the presence or absence of preferred criteria is in combination with thumbnail images of the linked pages. As the linked pages are prefetched, a thumbnail image of the linked page is generated and presented to the user to aid the user in navigating the web. For example, FIG. 9 depicts the screen image of search results returned by Altavista. The thumbnail image of each linked page is displayed in line next to the link. In one embodiment of the present invention, a dark border is placed around the thumbnail of links that contain matches to the user's undesirable criteria. Thus enabling the user to avoid wasting time with those pages. In the example depicted in FIG. 9, the first link having no title has a dark border indicating it is a page containing features the user does not desire. The fourth link entitled Lisa by Gary Paolini has a gray border placed around the thumbnail image of the linked page to indicate that some of the user's criteria were found in this page.

Figure 10:
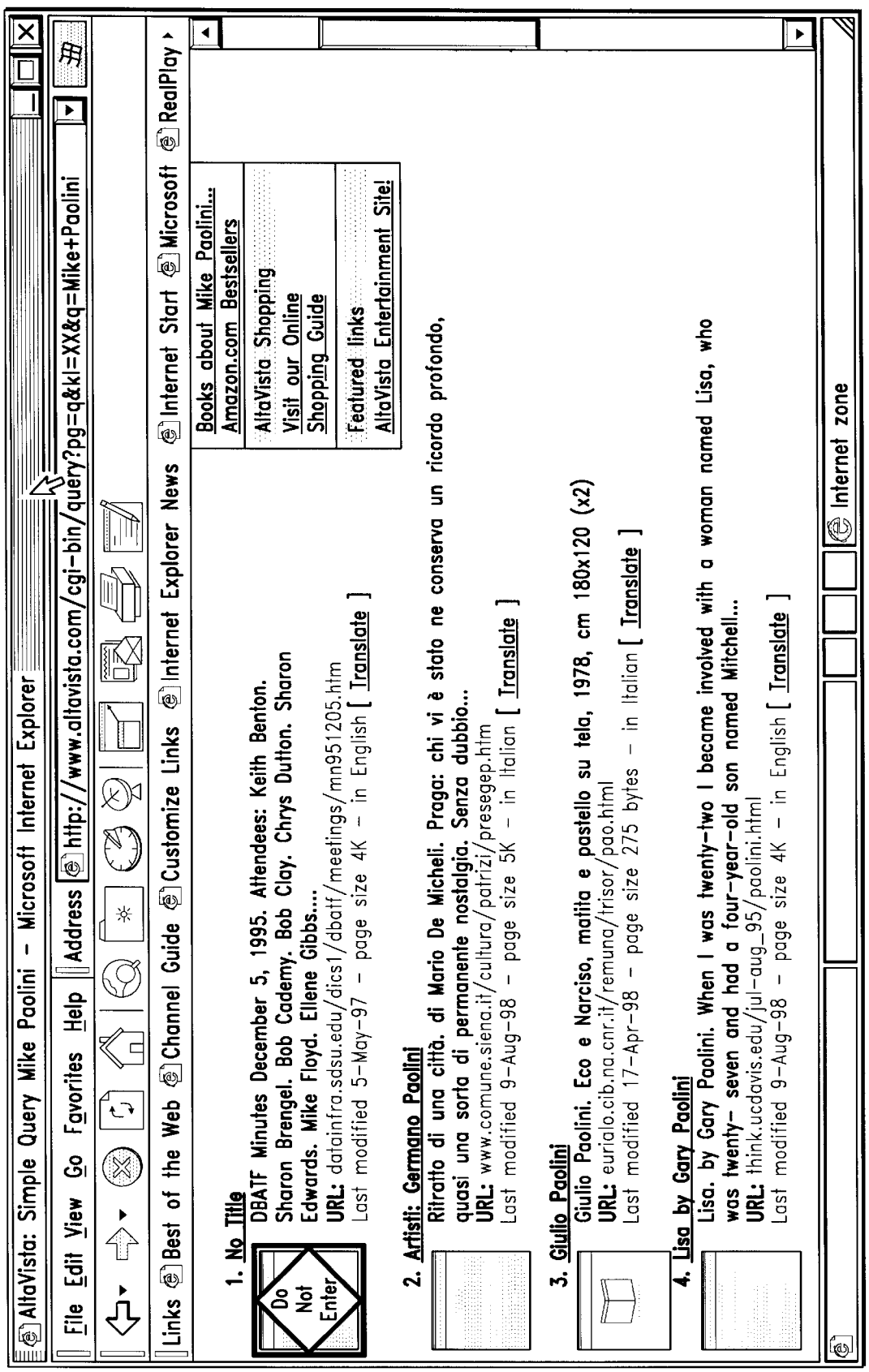
FIG. 10 depicts a screen image of search results with using the present invention with in-line thumbnail and thumbnail substitution.

Another example of methods of indicating the presence or absence of user preferences in linked pages is depicted in FIG. 10. FIG. 10 contains the same search results as in FIG. 9. However, the first link's thumbnail image has been replaced by a "Do Not Enter" icon indicating to the user that this linked page contains undesirable or objectionable features to the user. However, replacing a thumbnail image with another graphic is not limited to cases where objectionable material is found. For example, a green and red graphic might be replaced with a graphic or thumbnail using other colors for someone who is color blind. Also, it might be that all or some of the graphics are replaced with a blank image to maintain formatting, but reduce rendering time.

Figure 11:
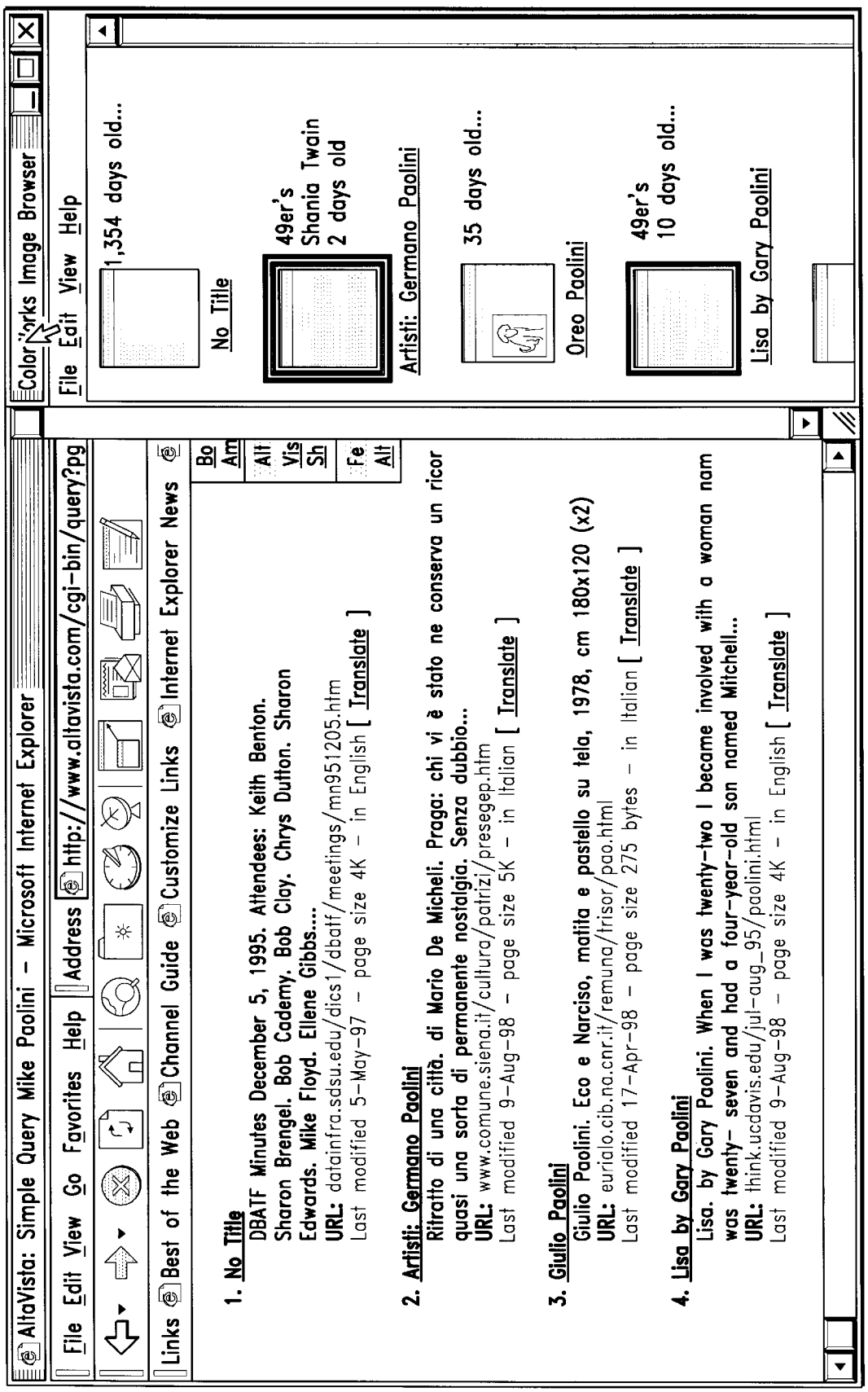
FIG. 11 depicts a screen image of search results using the present invention with a preview window and information summary.

Another example of methods of indicating the presence or absence of user preferences in linked pages is depicted in FIG. 11. In this example, the search results returned by AltaVista are displayed in one window while a separate window is opened containing the thumbnail images of the linked pages and an information summary indicating which of the user criteria were found in each page. In this example, the user had indicated a preference for web pages containing "Shania Twain", "49er's", and an indication of the age of the web page. Furthermore, the user has selected a configuration in which the navigation assistant highlights the thumbnail image of links that exceed a user determined threshold. In this case, the threshold is that the linked web page contain both "Shania Twain" and "49er's". The user has also configured the navigation assistant to place a single border around the thumbnail image of linked pages that contain any of the user's preferred criteria. Additionally, the user has configured the navigation assistant to place the age of the web page and any user criteria in a summary statement next to the thumbnail image.

The first, and third link did not contain "Shania Twain" or "49er's", therefore no border was placed around the thumbnail images of these links. However, the age of the web pages was indicated in the information summary next to the thumbnail image. Thus, the first thumbnail has "1,354 days old" placed next to it indicating that it has not been modified in 1,354 days. The third thumbnail has "35 days old" placed next to it indicating that it has not been modified in 35 days.

The second link matched all of the user's preferred criteria. Therefore, a double border has been placed around the thumbnail image of the linked page. Furthermore, the criteria found in the linked web page, "49er's" and "Shania Twain", as well as the age of the web page, "2 days old", have been placed next to the thumbnail image. Thus the user is provided more information with which to determine which link to follow.

The linked web page associated with the fourth thumbnail image has matched some of the user's criteria. Therefore, a single border has been placed around the thumbnail image. The matched criteria, "49er's", and the age of the linked web page, "10 days old", have been placed in the summary next to the thumbnail image.

If configured to provide the whole sentence in which the words were found, the result might look like "Shania Twain shows up at the 49er game, and sings at half-time," placed next to the link or thumbnail.

In another example of conveying information to the user, suppose that the user had indicated a preference for pages containing words "Java Programming". An icon representation of JavaScript, or a Java Applet might be placed next to the thumbnail of the link if that link contained the chosen criteria. Information on the age of the web page (if it was present, and the user had selected it as a preference) might also be placed there.

In another example of the presentation of the information provided by the navigation assistant of the present invention, any, and all of the information that might be displayed in a "preview window" could also be placed in flyover help for the link.

Examples of methods of indicating the presence of user specified criteria on a presently viewed web page include highlighting the matching text in bold or blocking the matching text in a background color different from the rest of the text. Other examples include replacing obscene words with stars. Other devices for indicating the presence or absence of desired criteria or undesired criteria will be obvious to one skilled in the art.

It is important to note that although searched criteria has been described as being selected by a user, it could also be selected by the maker of the plugin and could include a default setting if the user chooses not to select a criteria. It should also be noted that while the present invention has been described in terms of parsing the linked pages for specified criteria, other methods of determining the content of a linked page may be utilized as well. For example, the information on a linked page may be maintained in the form of an appendix or index page. Another example is to maintain such information in a database where the database might be created by the maker of the data expressly for this purpose or to aid search engines. However, the preferred method remains to actually parse the data in a linked page since that is the only true way to know the content of the data in a linked page since indexes become stale and the words that the author of a linked page might choose to put in a database to describe the content of the linked page might be different than the words chosen by a user of the Navigation Assistant.

In another modification to the present invention, the analysis of the prefetched pages is stored in a cache and if the browser recognized a URL, it need not prefetch and reanalyze, but rather may retrieve the information from the cache. However, this assumes that the content of a URL has not changed and that the configuration of the navigation assistant has not changed. Furthermore, this assumes that the information was of a type that could be cached (e.g., not a secure connection type of which no data is cached/stored). Furthermore, it assumes that caching was enabled (e.g., not everyone has caching turned on in their browser).

It should be noted that, while the present invention has been described primarily with reference to browsing the Internet and the World Wide Web, it is equally applicable to any navigation format where one is using a viewer. For example it may be applied to navigating Lotus Notes Databases, to personal records navigation, and to map navigation. In the case of may navigation, areas of the map may be highlighted. This would be useful in a case of zooming in for greater detailed resolution. Information which is not visible (e.g., because it is so small it cannot be drawn with the scale used) could be considered and treated like a link.

It is important to note that while the present invention has been described primarily in the context of a distribute database, it is equally applicable to a stand alone data processing system. For example, a user could physically download the entire contents of CNN's web site including all pages and store it on the user's machine. The user could then use the navigation assistant to help navigate the CNN web pages off line.

Although the present invention has been described primarily with reference to HTML documents, the present invention applies to other document formats and markup languages as well. For example, such other markup languages include, but are not limited to, Extensible Markup Language (XML), Vector Markup Language (VML), Virtual Reality Markup Language (VRML), Dynamic Hypertext Markup Language (DHTML), and Extended Hypertext Markup Language (XHTML). An example of other document formats includes, but is not limited, to a Postscript Document Format (PDF).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the browser has been illustrated in the form of Netscape Navigator or Microsoft Internet Explorer, it could be applied to any set of applications to send requests and retrieve documents from the Internet or any similar distributed data processing system such as a local area network or intranet. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of browsing the Internet comprising the steps of:
   retrieving a first page for presentation by a client browser;
   while the first page is being presented, parsing the first page for a set of links to a set of linked web pages and retrieving the set of linked pages;
   parsing the set of linked pages for criteria set by the user; and
   responsive to finding the criteria on a linked page within the set of linked pages, changing the presentation of the first page to indicate the presence of the criteria on the linked page.

2. The method of claim 1, wherein said parsing the first page for a set of links is performed on one or more background threads.

3. The method of claim 1, wherein at least two different criteria are present and the presentation of the first page is altered in different manners responsive to finding the different criteria on respective linked pages.

4. The method of claim 1, further comprising the steps of presenting an indicator proximate to each link to an inactive site, wherein the indicator indicates that said link is inactive.

5. The method of claim 1, further comprising the steps of:
   parsing said linked pages for a second set of links to a second set of linked web pages and retrieving the second set of linked web pages;
   parsing the second set of linked pages for a second criteria set by the user; and
   responsive to finding the second criteria on a linked page within the second set of linked pages, changing the presentation of the first page to indicate the presence of the second criteria on linked page within the second set of linked pages.

6. The method of claim 1, further comprising the steps of generating a thumbnail of each of the linked pages.

7. The method of claim 6, further comprising providing an indicator over a respective thumbnail to indicate the presence of the criteria on a respective linked page.

8. The method of claim 6, wherein said thumbnail is modified to indicate the presence of the criteria on a respective linked page.

9. The method of claim 6, wherein said thumbnail is modified to indicate the absence of the criteria on a respective linked page.

10. The method of claim 6, wherein said thumbnail is replaced with a different image to indicate the presence of the criteria on a respective linked page.

11. The method of claim 6, wherein said thumbnail is replaced with a different image.

12. The method of claim 6, wherein said thumbnail is replaced with a blank image.

13. The method of claim 6, wherein said thumbnail is presented proximate to a respective link to a linked page.

14. A computer software product including program instructions in a computer readable media for browsing the Internet, the computer software product comprising:
    first, instructions for retrieving a first page for presentation by a client browser;
    second, instructions for parsing, on one or more background threads, while the first page is being presented, the first page for a set of links to a set of linked web pages and retrieving the set of linked pages;
    third, instructions for parsing the set of linked pages for criteria set by the user; and
    fourth, instructions for changing the presentation of the first page, responsive to finding the criteria on one or more of the linked pages, to indicate the presence of the criteria on a respective linked page or pages.

15. The computer software product of claim 14, further comprising:
    fifth, instructions for parsing said linked pages for a second set of links to a second set of linked web pages and retrieving the second set of linked web pages; sixth, instructions for parsing the second set of linked pages for a second criteria set by the user; and seventh, instructions for changing the presentation of the first page, responsive to finding the second criteria on one or more of the linked pages, to indicate the presence of the second criteria on respective second linked web page.

16. An Internet browsing system, comprising:
    means for retrieving a first page for presentation by a client browser;
    means for parsing, on one or more background threads, while the first page is being presented, the first page for a set of links to a set of linked web pages and retrieving the set of linked pages;
    means for parsing the set of linked pages for criteria set by the user; and
    means for changing the presentation of the first page to indicate the presence of the criteria on respective linked page in response to finding the criteria on one or more of the linked pages.

17. The Internet browsing system of claim 16, further comprising:
    means for parsing said linked pages for a second set of links to a second set of linked web pages and retrieving the second set of linked web pages;
    means for parsing the second set of linked pages for a second criteria set by the user; and
    means, responsive to finding the second criteria on one or more of the linked pages, for changing the presentation of the first page to indicate the presence of the second criteria on respective second linked web page.

18. A method of browsing documents contained within a distributed database comprising the steps of:
    retrieving a document from the distributed database;
    parsing said document, while presenting said document, for a reference to another document in the distributed database;
    prefetching said other document;
    parsing said other document for a first criteria set by a user;
    indicating to the user whether said other document satisfies said first criteria.

19. The method of claim 18, wherein said distributed database is contained within an intranet.

20. The method of claim 18, wherein said distributed database is contained within the Internet.

21. The method of claim 18, wherein said distributed database is contained within a local area network.

22. The method of claim 18, wherein said distributed database is contained within a wide area network.

23. The method of claim 18, wherein said indicating step is performed by modifying the image of said document displayed to said user.

24. The method of claim 18, wherein said document is a web page.

25. The method of claim 18, wherein said document contains a plurality of references to a plurality of other documents.

26. The method of claim 18, further comprising the steps of:
    parsing said another page for a second reference to a second referenced document and retrieving the second referenced document;
    parsing the second referenced document for a second criteria set by the user; and
    responsive to finding the second criteria on said referenced page, indicating to said user whether said second criteria is present on said second referenced document.

27. The method of claim 26, wherein said first criteria is identical to said second criteria.

28. The method of claim 18, further comprising presenting a thumbnail image of said another document proximate to said reference to another document.

29. The method of claim 28, wherein said thumbnail image is surrounded by a border indicating the presence of desired content.

30. The method of claim 28, wherein said thumbnail image is surrounded by a border indicating the presence of undesirable content.

31. The method of claim 28, wherein said thumbnail image is modified prior to presentation to a user.

32. The method of claim 28, further comprising presenting an information summary of said document proximate to said thumbnail image.

33. The method of claim 32, wherein said information summary is a sentence from said another document that contains words for which said user indicated a preference.

34. The method of claim 32, wherein said information summary is a paragraph from said another document that contains words for which said user indicated a preference.

35. A computer software product including program instructions on a computer readable media for browsing documents contained within a distributed database, the computer software product comprising:

first instructions for retrieving a document from the distributed database;

second instructions for parsing said document, while presenting said document, for a reference to another document in the distributed database;

third instructions for prefetching said other document;

fourth instructions for parsing said other document for a first criteria;

fifth instructions for indicating to the user whether said other document satisfies said first criteria.

36. The computer software product of claim 35 further comprising:

sixth instructions for parsing said another page for a second reference to a second referenced document and retrieving the second referenced document;

seventh instructions for parsing the second referenced document for a second criteria set by the user; and eighth instructions for indicating to said user, responsive to finding the second criteria on said referenced page, whether said second criteria is present on said second referenced document.

37. The computer software product of claim 35 wherein said first criteria is set by a user.

38. The computer software product of claim 35 wherein said first criteria is set by a plugin maker.

39. The computer software product of claim 35 wherein said first criteria is a default criteria.

40. A system for browsing documents contained within a distributed database comprising:

means for retrieving a document from the distributed database;

means for parsing said document, while presenting said document, for a reference to another document in the distributed database;

means for prefetching said other document;

means for parsing said other document for a first criteria set by a user;

means for indicating to the user whether said other document satisfies said first criteria.

41. The system of claim 40 further comprising:

means for parsing said another page for a second reference to a second referenced document and retrieving the second referenced document;

means for parsing the second referenced document for a second criteria set by the user; and means for indicating to said user, responsive to finding the second criteria on said referenced page, whether said second criteria is present on said second referenced document.

42. A method of browsing a local database comprising the steps of:

retrieving a first page for presentation by a client browser;

while the first page is being presented, parsing the first page for a set of links to a set of linked pages and retrieving the set of linked pages;

parsing the set of linked pages for criteria set by the user; and responsive to finding the criteria on a linked page within the set of linked pages, changing the presentation of the first page to indicate the presence of the criteria on the linked page.

43. The method of claim 42, wherein said parsing the first page for a set of links is performed on one or more background threads.

44. The method of claim 42, wherein at least two different criteria are present and the presentation of the first page is altered in different manners responsive to finding the different criteria on respective linked pages.

45. The method of claim 42, further comprising the steps of presenting an indicator proximate to each link to an inactive site, wherein the indicator indicates that said link is inactive.

46. The method of claim 42, further comprising the steps of:

parsing said linked pages for a second set of links to a second set of linked pages and retrieving the second set of linked pages;

parsing the second set of linked pages for a second criteria set by the user; and responsive to finding the second criteria on a linked page within the second set of linked pages, changing the presentation of the first page to indicate the presence of the second criteria on a linked page within the second set of linked pages.

47. The method as recited in claim 42 wherein the local database is located on a stand alone data processor.

48. A data processing system comprising:

a bus system;

a communications unit connected to the bus system;

a memory connected to the bus system, wherein the memory includes a set of instructions; and a processing unit connected to the bus system, wherein the processing unit executes the set of instructions to retrieve a first page for presentation by a client browser; parse the first page for a set of links to a set of linked pages and retrieve the set of linked pages while the first page is being presented; parse the set of linked pages for criteria set by the user; change the presentation of the first page to indicate the presence of the criteria on the linked page in response to finding the criteria on a linked page within the set of linked pages.

49. The data processing system of claim 48, wherein the processors further executes the set of instructions to parse said linked pages for a second set of links to a second set of linked web pages and retrieve the second set of linked web pages; parse the second set of linked pages for a second criteria set by the user; and change the presentation of the first page to indicate the presence of the second criteria on linked page within the second set of linked pages in response to finding the second criteria on a linked page within the second set of linked pages.

50. A method of browsing the Internet comprising the steps of:

retrieving a first page for presentation by a client browser;

parsing the first page for a set of links to a set of linked pages and retrieving the set of linked pages;

parsing the set of linked pages for criteria set by the user; and responsive to finding the criteria on a linked page within the set of linked pages, changing the presentation of the first page to indicate the presence of the criteria on the linked page.

51. The method of claim 50, wherein the first page is displayed prior to changing the presentation of the first page.

52. A data processing system of browsing the Internet comprising:

retrieving means for retrieving a first page for presentation by a client browser;

first parsing means for parsing the first page for a set of links to a set of linked pages and retrieving the set of linked pages;

second parsing means for parsing the set of linked pages for criteria set by the user; and changing means, responsive to finding the criteria on a linked page within the set of linked pages, for changing the presentation of the first page to indicate the presence of the criteria on the linked page.

53. The data processing system of claim 52, wherein the first page is displayed prior to changing the presentation of the first page.

54. A computer program product in a computer readable medium for browsing the Internet, the computer program product comprising:

first instructions for retrieving a first page for presentation by a client browser;

second instructions for parsing the first page for a set of links to a set of linked pages and retrieving the set of linked pages;

third instructions for parsing the set of linked pages for criteria set by the user; and fourth instructions, responsive to finding the criteria on a linked page within the set of linked pages, for changing the presentation of the first page to indicate the presence of the criteria on the linked page.

55. The computer program product of claim 54, wherein the first page is displayed prior to changing the presentation of the first page.

* * * * *